United States Patent
Garg et al.

(10) Patent No.: US 8,526,601 B2
(45) Date of Patent: Sep. 3, 2013

(54) METHOD OF IMPROVING OPERATIONAL SPEED OF ENCRYPTION ENGINE

(75) Inventors: Atul Garg, Sunnyvale, CA (US); Siaw-Kang Lai, Singapore (SG)

(73) Assignee: Advanced Micro Devices, Inc., Sunnyvale, CA (US)

( * ) Notice: Subject to any disclaimer, the term of this patent is extended or adjusted under 35 U.S.C. 154(b) by 3101 days.

(21) Appl. No.: 10/818,017

(22) Filed: Apr. 5, 2004

(65) Prior Publication Data
US 2005/0226409 A1 Oct. 13, 2005

(51) Int. Cl.
H04K 1/00 (2006.01)
H04L 9/00 (2006.01)
G06F 9/00 (2006.01)
G06F 1/04 (2006.01)

(52) U.S. Cl.
USPC .............. 380/28; 380/268; 713/500; 713/600

(58) Field of Classification Search
USPC ...................... 380/28, 29, 268; 713/500, 600
See application file for complete search history.

(56) References Cited

U.S. PATENT DOCUMENTS

| | | | | |
|---|---|---|---|---|
| 3,634,658 A * | 1/1972 | Brown | ............................ | 377/33 |
| 3,902,056 A * | 8/1975 | Aizenberg et al. | ............ | 359/597 |
| 4,074,336 A * | 2/1978 | Clarke | ............................ | 361/88 |
| 4,584,640 A * | 4/1986 | MacGregor et al. | .......... | 707/200 |
| 5,008,935 A * | 4/1991 | Roberts | ............................ | 380/29 |
| 5,946,369 A | 8/1999 | Kolagotla et al. | | |
| 5,999,953 A * | 12/1999 | Monier | ......................... | 708/250 |
| 6,199,162 B1 * | 3/2001 | Luyster | ......................... | 713/168 |
| 6,317,769 B1 * | 11/2001 | Kobayashi et al. | ........... | 708/491 |
| 6,536,016 B1 * | 3/2003 | Andreev et al. | ................... | 716/3 |
| 6,580,296 B1 * | 6/2003 | Beiu | ............................. | 326/121 |
| 6,820,105 B2 * | 11/2004 | Blaker | ........................ | 708/491 |
| 6,943,579 B1 * | 9/2005 | Hazanchuk et al. | ............ | 326/39 |
| 6,961,846 B1 * | 11/2005 | Fleck et al. | ................... | 712/223 |
| 7,197,527 B2 * | 3/2007 | Naslund et al. | ............... | 708/492 |

OTHER PUBLICATIONS

RFC 1321—The MD5—Message-Digest Algorithm by R. Rivest, MIT Laboratory for Computer Science and RSA Data Security, Inc., Apr. 1992, pp. 1-18.
Network Working Group, R. Rivest, MIT Laboratory for Computer Science and RSA Data Security, Inc., Apr. 1992, pp. 1-21.
Computer Arithmetic, Behrooz Parhami, Oxford University Press, New York, pp. 114-120.
Office Action for Chinese Patent Application No. 20050018329.X, dated May 22, 2009.
Office Action for Chinese Patent Application No. 20050018329.X, dated Apr. 13, 2010.
Office Action for German Patent Application No. 11 2005 000 776. 6-31 dated Dec. 2, 2010.

\* cited by examiner

*Primary Examiner* — Mohammad W Reza
(74) *Attorney, Agent, or Firm* — Terrile, Cannatti, Chambers & Holland, LLP; Michael Rocco Cannatti

(57) ABSTRACT

In the present method of implementing functioning of an encryption engine, a plurality of logic blocks are provided, each for running a function. Each function is run based on three variables, each of which may have a first or second value. The function is run with the first variable value selected as having its first value, and with the second and third variables having their actual values. The function is again run with the first variable value selected as having its second value, and again with the second and third variables having their actual values. An actual value of the first variable is determined, and the output of the logic block is determined by the actual value of the first variable.

8 Claims, 9 Drawing Sheets

METHOD OF IMPROVING OPERATIONAL SPEED OF ENCRYPTION ENGINE

BACKGROUND OF THE INVENTION

1. Field of the Invention

This invention relates generally to increasing operational speed in an encryption domain.

2. Discussion of the Related Art

The document "RFC 1321-The MD5—Message-Digest Algorithm" by R. Rivest, MIT Laboratory for Computer Science and RSA Data Security, Inc., April 1992, pages 1-18, incorporated by reference herein, discloses an operational approach represented by the structure of FIG. 1. In such operation, register A is filled with data made up of 32 bits ($A_{31}, A_{30}, \ldots A_0$), register B is filled with data made up of 32 bits ($B_{31}, B_{30}, \ldots B_0$), register C is filled with data made up of 32 bits ($C_{31}, C_{30}, \ldots C_0$), and register D is filled with data made up of 32 bits ($D_{31}, D_{30}, \ldots D_0$). In addition, register 5 is filled with 512 bits of data, and register 6 is filled with 512 bits of data. Each of the bits in the registers A, B, C, D, 5, and 6 may have a value of 0 or 1.

In accordance with that paper, four auxiliary functions are defined:

F(B, C, D)=BC v not(B) D
G(B, C, D)=BD v C not(D)
H(B, C, D)=B xor C xor D
I(B, C, D)=C xor (B v not(D))

In addition, the 512 bits in the register 5 are broken down into 16 separate groups (k=0-15) of 32 bits each, and the function X(k) operates to select a group thereof determined by the value of k. The 512 bits in the register 6 are broken down into 16 separate groups (i=1-16) of 32 bits each, and the function T(i) operates to select a group thereof determined by with the value of i. The function CLS(s) rotator 11 operates to rotate the contents presented thereto by a number of bits determined by the value s (s=1-64).

With [ABCD k s i] denoting the operation for each of the following rounds:

Referring to FIGS. 1 and 2, the first operation of the first round, i.e., [ABCD 0 7 1] will now be described.

Initially, the 32-bit data set in the register A is applied to the adder 7. The first variable of the data set of register B, i.e., the bit $B_{31}$, the first variable of the data set in register C, i.e., the bit $C_{31}$, and the first variable of the data set in register D, i.e., the bit $D_{31}$ (first set of variables $B_{31}, C_{31}, D_{31}$) are applied as inputs to the logic block 8, which can apply either the function F, G, H or I to these variables. At the same time, the second variable of the data set of register B, i.e., the bit $B_{30}$, the second variable of the data set of register C, i.e., the bit $C_{30}$, and the second variable of the data set of register D, i.e., the bit $D_{30}$ (second set of variables $B_{31}, C_{31}, D_{31}$) are also applied as inputs to the logic block 8, etc., for each of the sets of variables. In this particular case, the function F is applied to these variables (FIG. 2). The process is run in parallel on each of the 32 sets of three bits, generating a 32-bit output which is applied to the adder 7. With application of the 32-bit output from the logic block 8 to the adder 7, the contents of the register B are applied to the register C and to the adder 12, the contents of the register C are applied to the register D, and the contents of register D are applied to register A. The input from the logic block 8 and the data set of register A applied to the adder 7 are added by the adder 7, which provides a 32-bit output to adder 9. The value k=0 indicates that the 32-bit group 0 of the register 5 is applied as an input to the adder 9, and the input from the adder 7 and the 32-bit group 0 of the register 5 are added by the adder 9. The output of the adder 9 is applied to adder 10, and the value i=1 indicates that the 32-bit group 1 of the register 6 is applied as an input to the adder 10, and the input from the adder 9 and the 32-bit group 1 of register 6 are added by the adder 10. The 32-bit output from the adder 10 is rotated by the rotator CLS(s) 11 as determined by the number s, in this case, s=7. The rotated contents are applied to the adder 12, and are added to the contents of register B which have been applied to the adder 12. The output of the adder 12 is applied to the register B.

For the second operation of the first round, i.e., [DABC 1 12 2] the procedure is repeated, again applying the function F,

```
/* Round 1. */
    result = b + ((a + F(b,c,d) + X[k] + T[i]) <<< s). */
/* The following 16 operations are undertaken. */
   [ABCD   0   7    1]  [DABC   1   12    2]  [CDAB   2   17    3]  [BCDA   3   22    4]
   [ABCD   4   7    5]  [DABC   5   12    6]  [CDAB   6   17    7]  [BCDA   7   22    8]
   [ABCD   8   7    9]  [DABC   9   12   10]  [CDAB  10   17   11]  [BCDA  11   22   12]
   [ABCD  12   7   13]  [DABC  13   12   14]  [CDAB  14   17   15]  [BCDA  15   22   16]
/* Round 2. */
    result = b + ((a + G(b,c,d) + X[k] + T[i]) <<< s). */
/* Do the following 16 operations. */
   [ABCD   1   5   17]  [DABC   6    9   18]  [CDAB  11   14   19]  [BCDA   0   20   20]
   [ABCD   5   5   21]  [DABC  10    9   22]  [CDAB  15   14   23]  [BCDA   4   20   24]
   [ABCD   9   5   25]  [DABC  14    9   26]  [CDAB   3   14   27]  [BCDA   8   20   28]
   [ABCD  13   5   29]  [DABC   2    9   30]  [CDAB   7   14   31]  [BCDA  12   20   32]
/* Round 3. */
    result = b + ((a + H(b,c,d) + X[k] + T[i]) <<< s). */
/* Do the following 16 operations. */
   [ABCD   5   4   33]  [DABC   8   11   34]  [CDAB  11   16   35]  [BCDA  14   23   36]
   [ABCD   1   4   37]  [DABC   4   11   38]  [CDAB   7   16   39]  [BCDA  10   23   40]
   [ABCD  13   4   41]  [DABC   0   11   42]  [CDAB   3   16   43]  [BCDA   6   23   44]
   [ABCD   9   4   45]  [DABC  12   11   46]  [CDAB  15   16   47]  [BCDA   2   23   48]
/* Round 4. */
    result = b + ((a + I(b,c,d) + X[k] + T[i]) <<< s). */
/* Do the following 16 operations. */
   [ABCD   0   6   49]  [DABC   7   10   50]  [CDAB  14   15   51]  [BCDA   5   21   52]
   [ABCD  12   6   53]  [DABC   3   10   54]  [CDAB  10   15   55]  [BCDA   1   21   56]
   [ABCD   8   6   57]  [DABC  15   10   58]  [CDAB   6   15   59]  [BCDA  13   21   60]
   [ABCD   4   6   61]  [DABC  11   10   62]  [CDAB   2   15   63]  [BCDA   9   21   64]
``` and this procedure is repeated for all 16 operations of the first round, each of which applies the function F.

For the first operation of the second round, i.e., [ABCD 1 5 17], the above procedure is applied, however, with the logic block 8 applying the function G to the inputs provided thereto (FIG. 4). Similar to the above, 16 operations of the second round are undertaken in accordance with the above chart.

The third and fourth rounds are undertaken in like manner, using the function H (FIG. 5) and the function I (FIG. 6) respectively, again in accordance with the above chart.

As will be seen, the application of a function by the logic block 8 is dependent on inputs from registers B, C and D. While in each operation the contents of registers C and D are directly available to the logic block 8, after the first operation of the first round, the contents of register B to be applied to the logic block 8 are arrived at through a number of calculations involving adder 7, register 5, adder 9, adder 10, register 6, rotator 11, and adder 12. This time-consuming process causes the overall system to operate more slowly than is desired, since the logic block 8 must wait for inputs from all three registers B, C and D before applying the function thereof.

Therefore, what is needed is a method for speeding up the operation described above.

SUMMARY OF THE INVENTION

In the present method of implementing functioning of an encryption engine, first and second logic blocks are provided, each for running a function, the running of the function of the first logic block based on an input of a first variable which may have a first or second value and an input of a second variable which may have a first or a second value, the running of the function of the second logic block based on an input of the first variable which may have said first or said second value and an input of the third variable which may have a first or second value. An actual value of the second variable is provided. The function of the first logic block is run based on an input of the first variable set at the first value thereof, and an input of the second variable based on the actual value thereof, to provide a first output. The function of the first logic block is run based on an input of the first variable set at the second value thereof, and an input of the second variable based on the actual value thereof, to provide a second output. An actual value of the third variable is provided. The function of the second logic block is run based on an input of the first variable set at the first value thereof, and an input of the third variable based on the actual value thereof, to provide a third output. The function of the second logic block is run based on an input of the first variable set at the second value thereof, and an input of the third variable based on the actual value thereof, to provide a fourth output.

The present invention is better understood upon consideration of the detailed description below, in conjunction with the accompanying drawings. As will become readily apparent to those skilled in the art from the following description, there is shown and described an embodiment of this invention simply by way of the illustration of the best mode to carry out the invention. As will be realized, the invention is capable of other embodiments and its several details are capable of modifications and various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as said preferred mode of use, and further objects and advantages thereof, will best be understood by reference to the following detailed description of an illustrative embodiment when read in conjunction with the accompanying drawings, wherein:

DETAILED DESCRIPTION

Reference is now made in detail to a specific embodiment of the present invention which illustrates the best mode presently contemplated by the inventors for practicing the invention.

Figure 7:
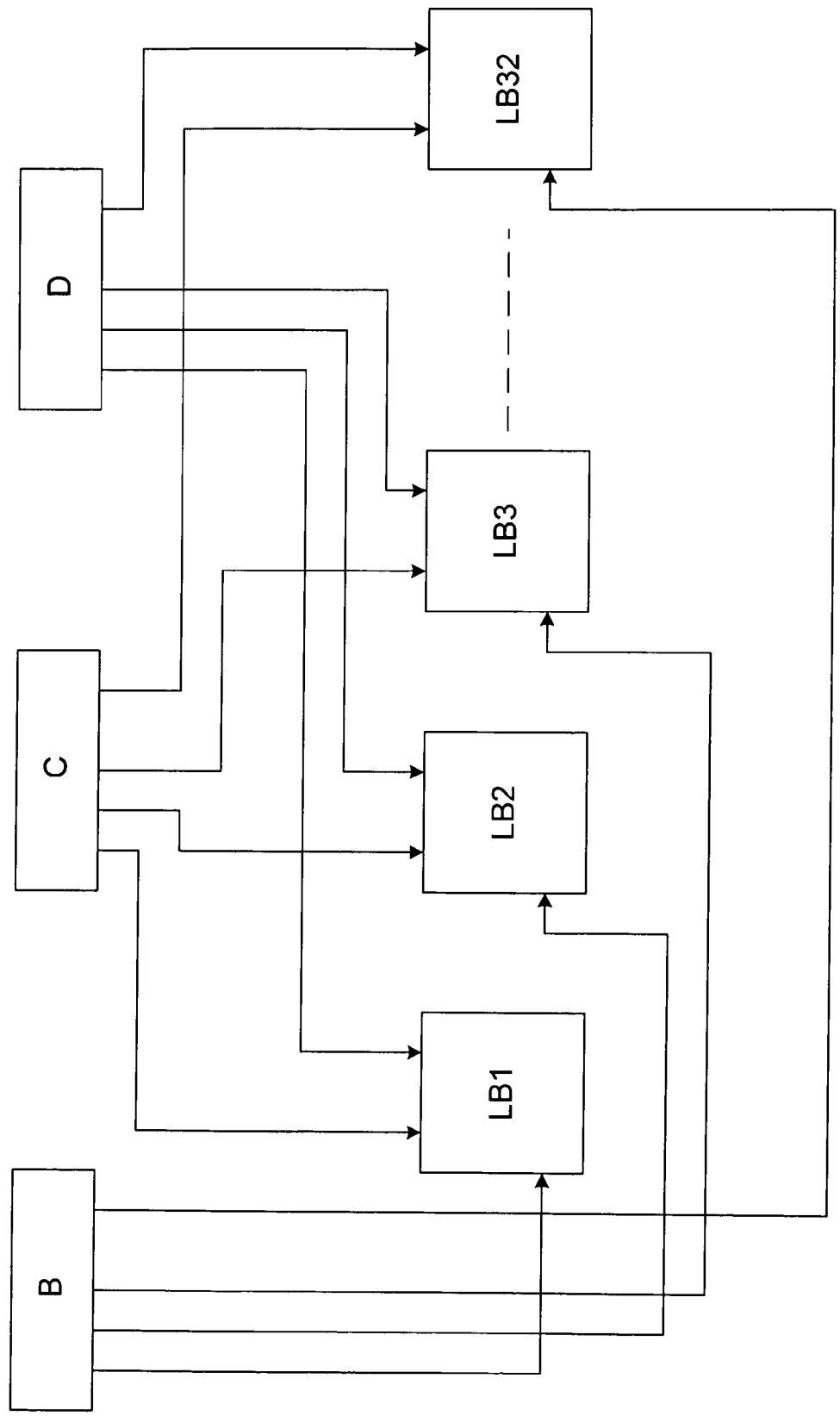
FIGS. 7-14 illustrate operation of the present inventive method.
Figure 8:
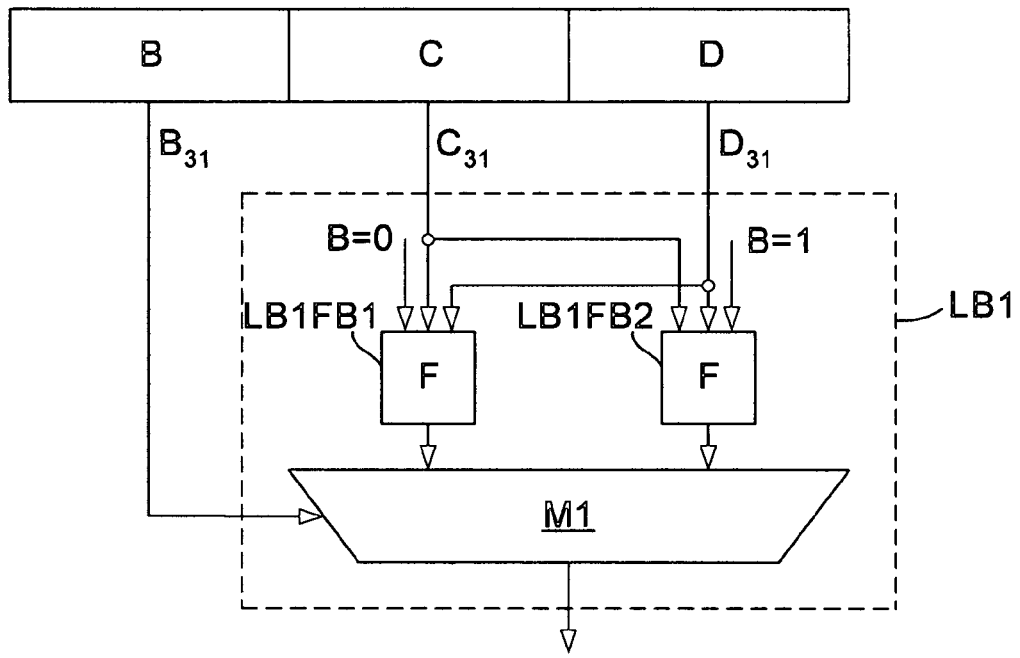
Figure 9:
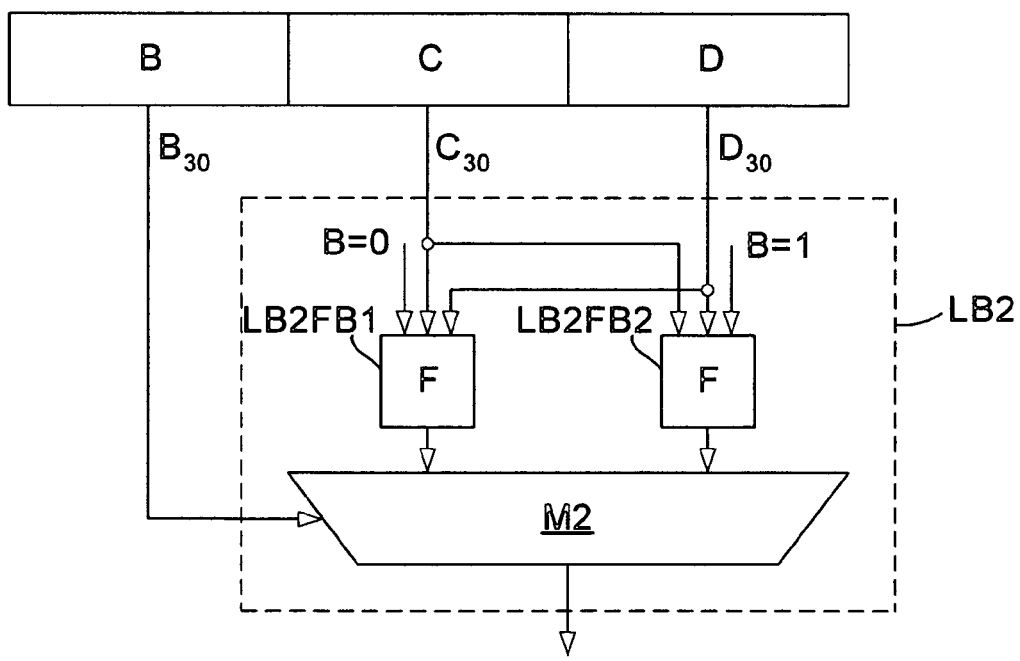
Figure 10:
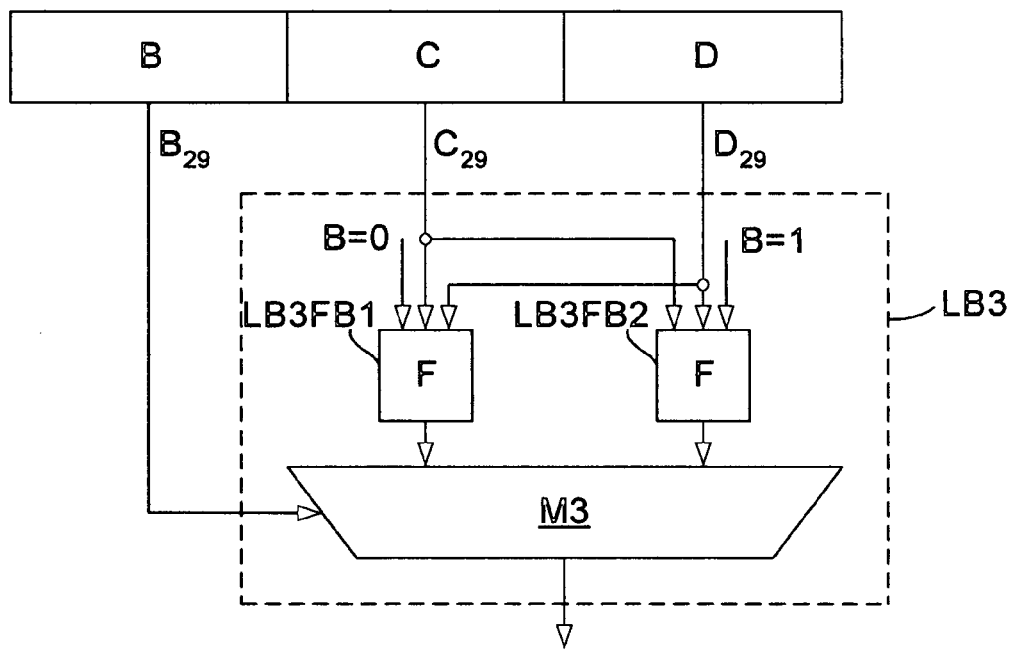
Figure 11:
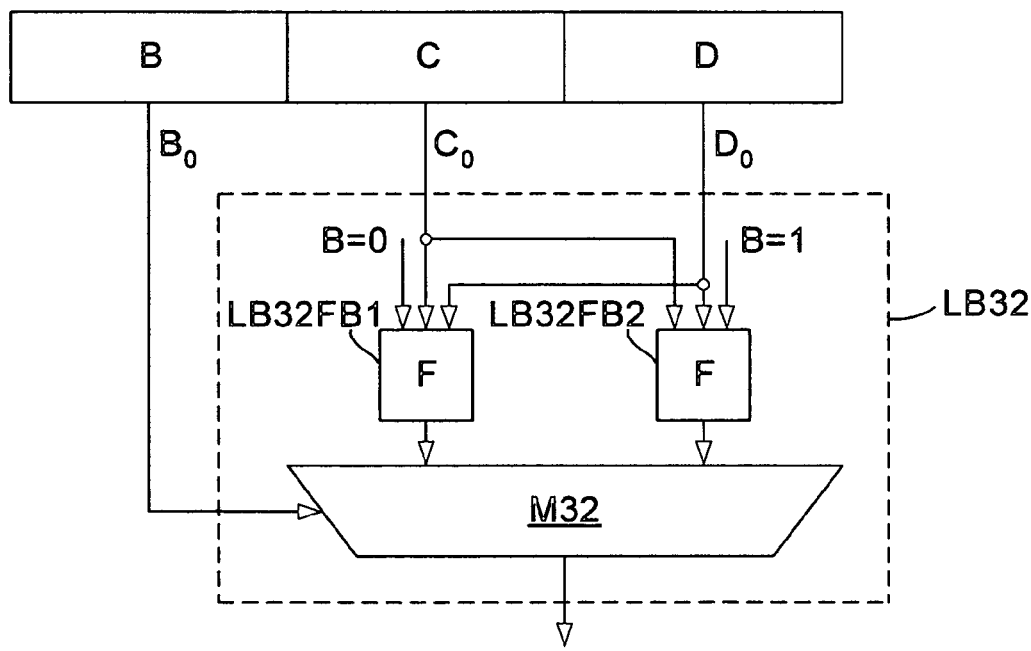

FIG. 7 illustrates this embodiment of the present invention. As shown therein, 32 individual logic blocks LB1, LB2, LB3, - - - LB32 are provided, these logic blocks LB1-LB32 replacing the single logic block 8 of FIG. 1. It will be remembered that in the embodiment of FIG. 1, each of the registers B, C, D had 32 connections in parallel to the single logic block 8. In the present embodiment, as will be seen in FIG. 7, the register B has individual connections to each of the logic blocks LB1-LB32, the register C has individual connections to each of the logic blocks LB1-LB32, and the register D has individual connections to each of the logic blocks LB1-LB32. The logic blocks LB1-LB32 are identical in configuration, and the details thereof, for example logic blocks LB1, LB2, LB3, and LB32 are shown in FIG. 8-11. Each logic block includes two function blocks for running the functions F, G, H, I as selected, i.e., logic block LB1 includes function blocks LB1FB1, LB1FB2, logic block LB2 includes function blocks LB2FB1, LB2FB2, etc. Simultaneously, the actual values of bits $C_{31}$, $D_3$, are applied as inputs to both the function blocks LB1FB1, LB1FB2 of the logic block LB1 (FIG. 8), the actual values of bits $C_{30}$, $D_{30}$ are applied as inputs to both the function blocks LB2FB1, LB2FB2 of the logic block LB2 (FIG. 9), the actual values of bits $C_{29}$, $D_{29}$ are applied as inputs to both the function blocks LB3FB1, LB3FB2 of the logic block LB3 (FIG. 10), etc., through all the logic blocks, with the actual values of bits $C_0$, $D_0$ applied as inputs to both the function blocks LB32FB1, LB32FB2 of the logic block LB32 (FIG. 11). Within each logic block, an additional input is provided to each function block, with the input set at 0 for one function block, and set at 1 for the other function block. For example, as illustrated in FIG. 8, the additional input to the function block LB1FB1 is set at 0, and the additional input to the function block LB1FB2 is set at 1. This represents both possible values for an individual bit in the register B.

In operation, the function block LB1FB1 of logic block LB1 runs the function F with inputs $C_{31}$, $D_{31}$, B=0, while the function block LB1FB2 of logic block LB1 runs the function F with inputs $C_{31}$, $D_{31}$, B=1 (FIG. 8). Simultaneously, the function block LB2FB1 of logic block LB2 runs the function F with inputs $C_{30}$, $D_{30}$, B=0, the function block LB2FB2 of logic block LB2 runs the function F with inputs $C_{30}$, $D_{30}$, B=1 (FIG. 9), the function block LB3FB1 of logic block LB3 runs the function F with inputs $C_{29}$, $D_{20}$, B=0, the function block LB3FB2 of logic block LB3 runs the function F with inputs $C_{29}$, $D_{29}$, B=1 (FIG. 10), through all the logic blocks, with the function block LB32FB1 of logic block LB32 running the function F with inputs $C_0$, $D_0$, B=$_0$, and the function block LB32FB2 of logic block LB32 running the function F with inputs $C_0$, $D_0$, B=1 (FIG. 11). Within each logic block, the outputs of the pair of function blocks are provided to a multiplexer (for example, in logic block LB1, the outputs from function blocks LB1FB1, LB1FB2 are provided to the multiplexer M1, in logic block LB2, the output from function blocks LB2FB1, LB2FB2 are provided to the multiplexer M2, etc.). All of these operations are undertaken prior to data being provided from register B, which data, as set forth above, may the delayed in reaching register B. However, in anticipation of such data reaching register B, the calculations undertaken are based on both values of each individual bit of data which will be provided to the register B. Then, when such (32 bit) data does indeed reach and is in register B, the actual value of the bit B31 in register B is applied as in input to the multiplexer M1, which, based on this input, selects, as an actual output, the output of a function block (either function block LB1FB1 or function block LB1FB2) which is based on the actual value of the bit $B_{31}$ in register B, i.e., if the actual value of bit $B_{31=0}$, the output from function block LB1FB1 is selected as the output of the logic block LB1, whereas if the actual value of bit $B_{31}$=0, the output from function block LB1FB1 is selected as the output of the logic block LB1. Likewise, the actual output for the second logic block LB2 will be based on the actual value of bit $B_{30}$ in register B, the actual output for the third logic block LB3 will be based on the actual value of bit $B_{29}$ in register B etc.

Figure 1:
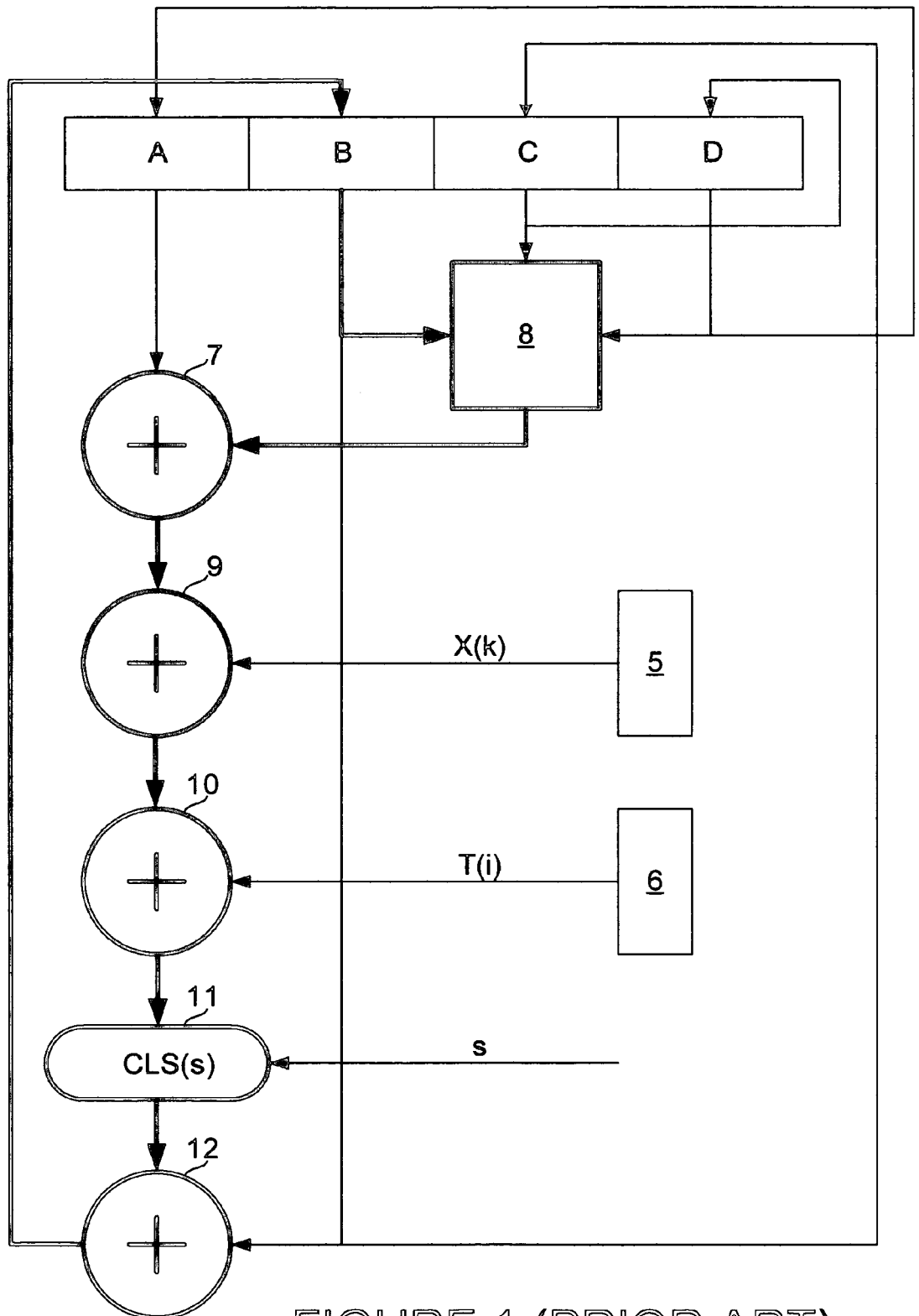
FIGS. 1-6 illustrate operation of the previous prior art method.
Figure 2:
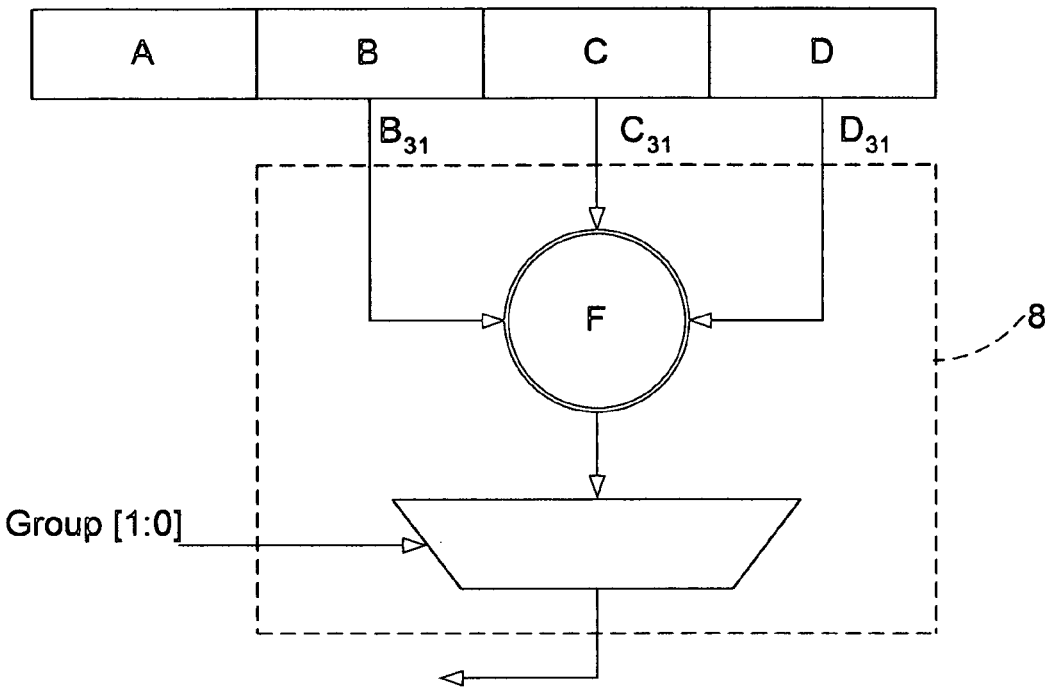
Figure 3:
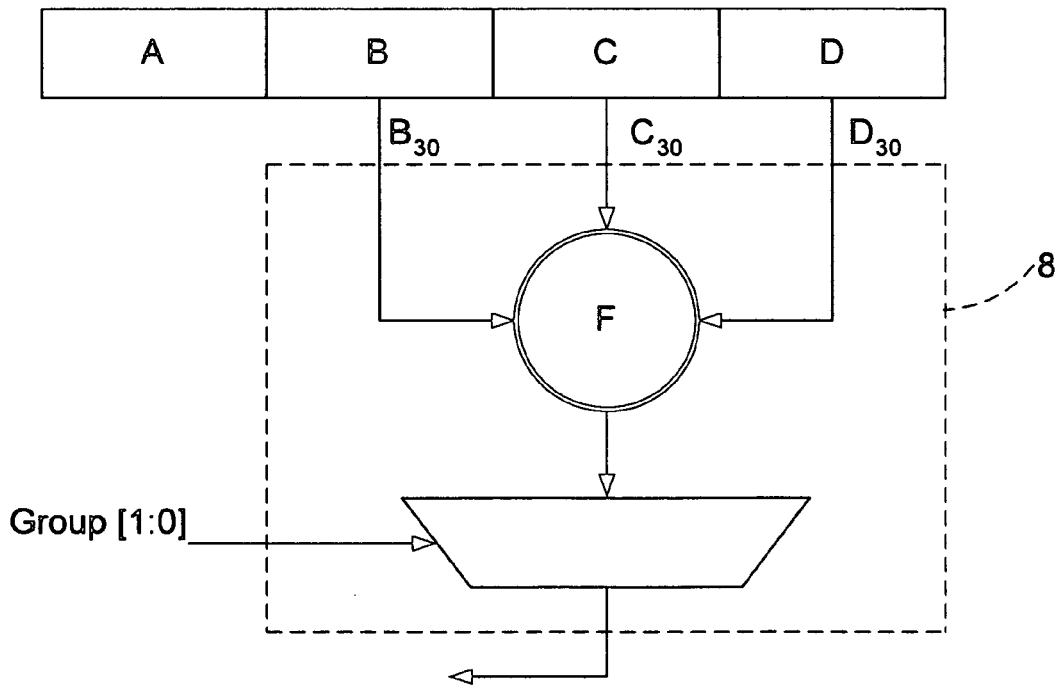
Figure 4:
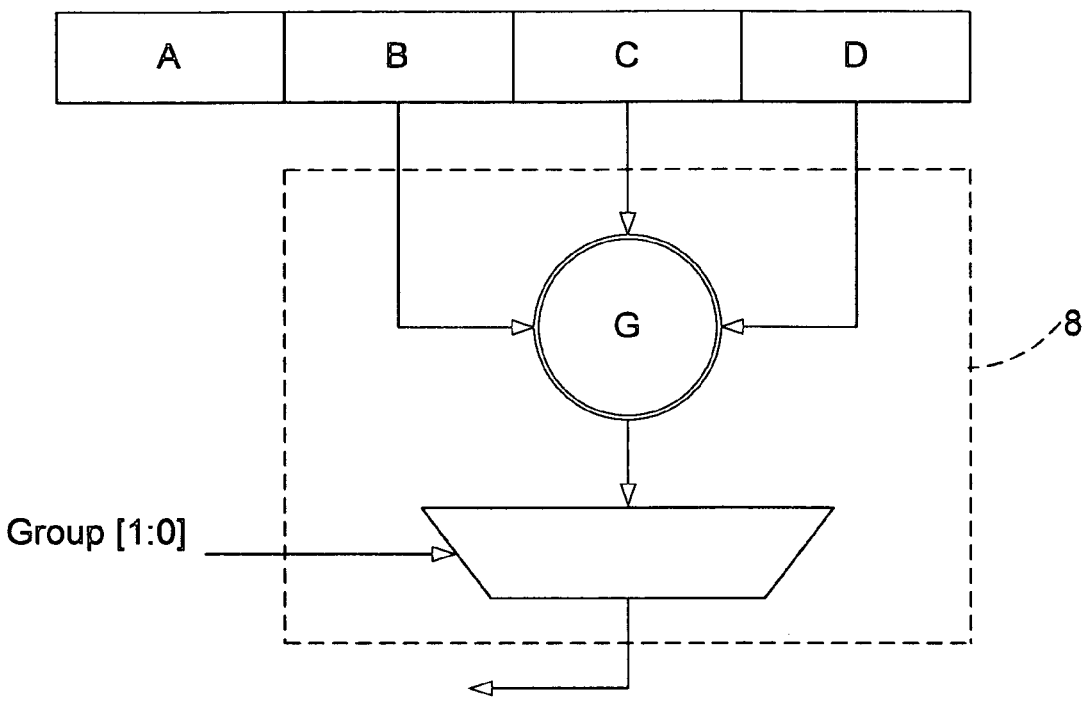
Figure 5:
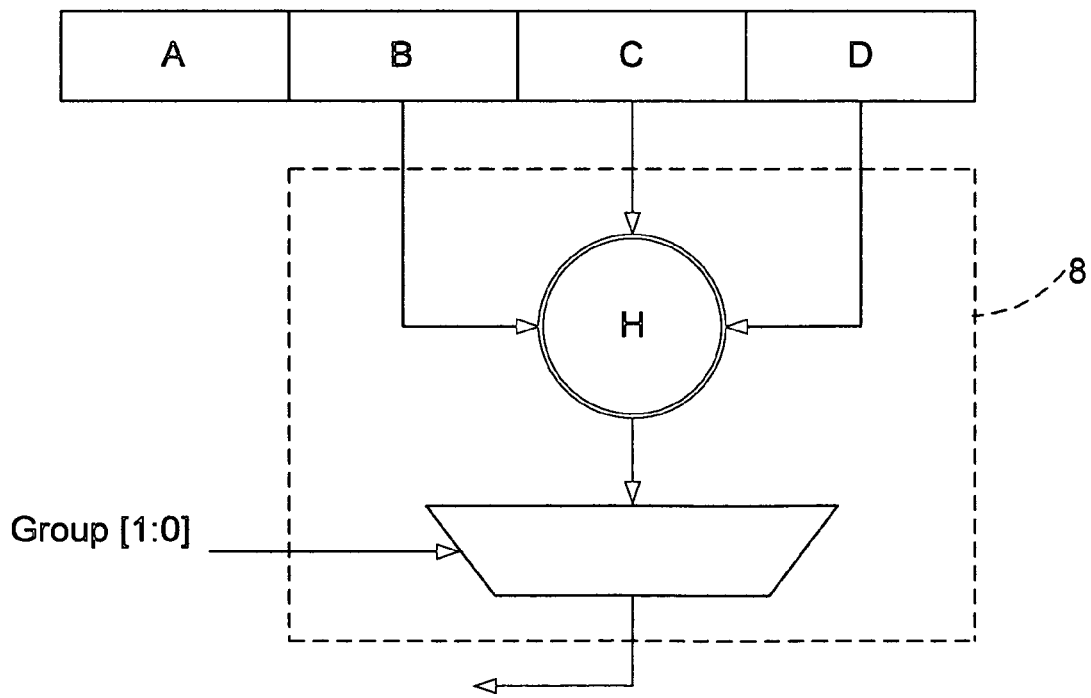
Figure 6:
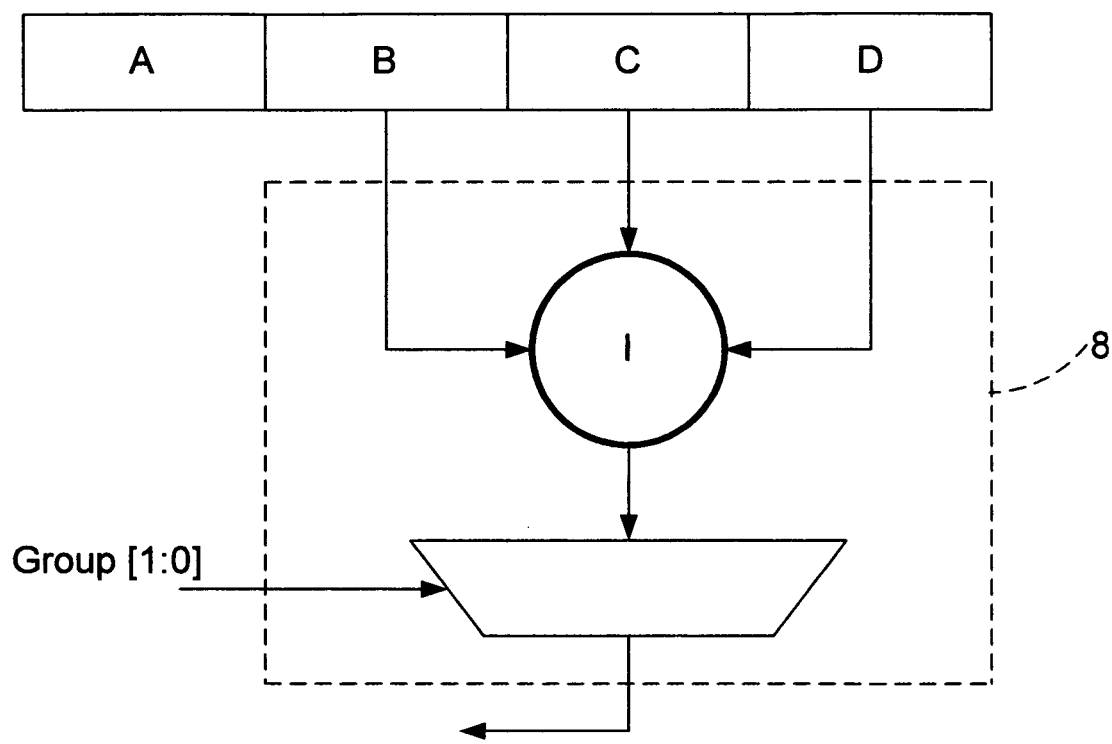
Figure 12:
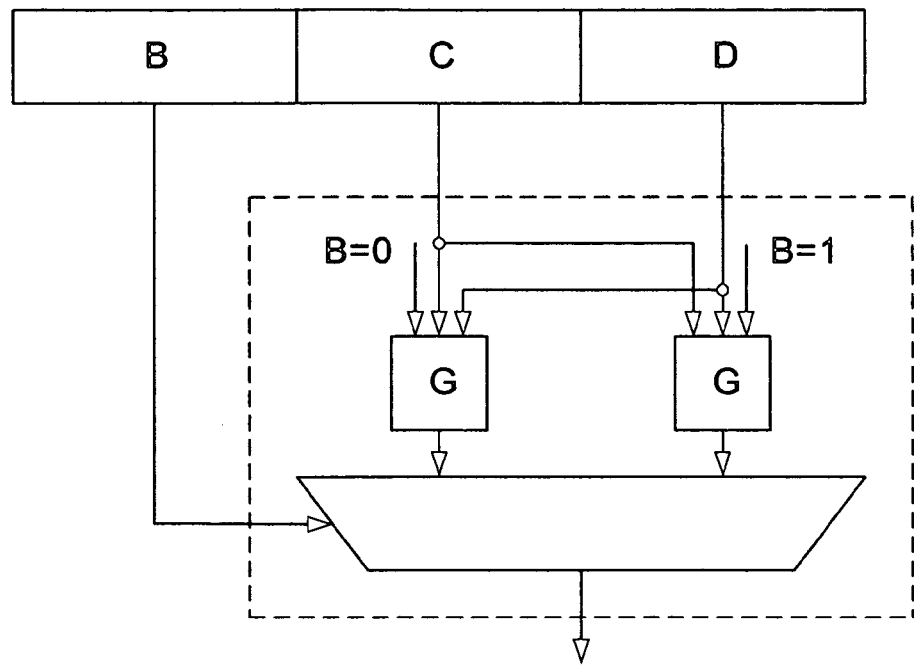
Figure 13:
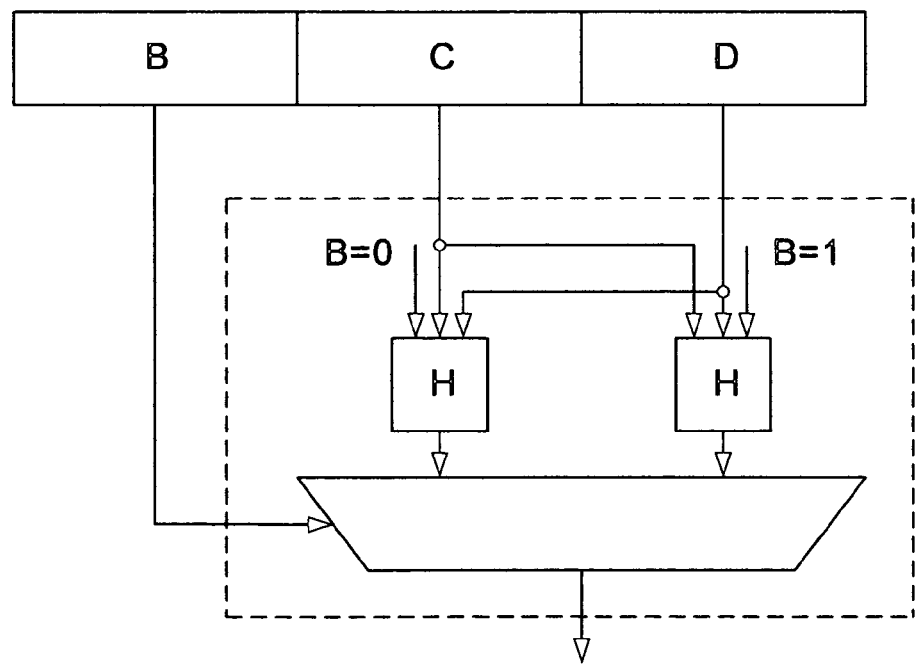
Figure 14:
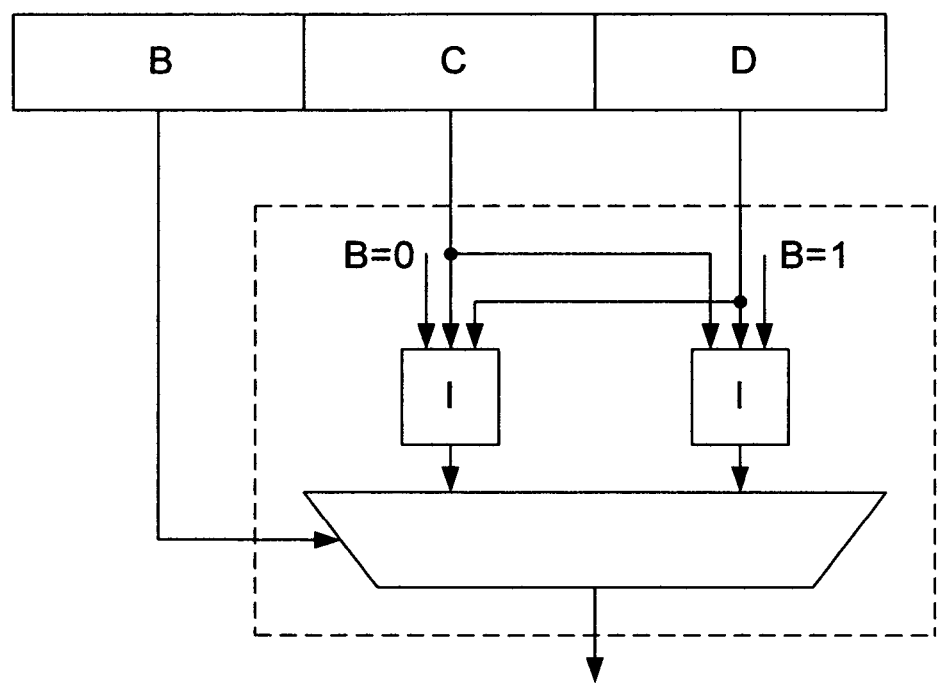

The individual outputs of the logic blocks LB1-LB32 make up the individual bits of the 32-bit data which is applied to the adder 7 of FIG. 1, which was previously supplied by logic block 8. All 16 operations of round 1 are undertaken as described above (see chart above), based on the function F. Similar to the above, 16 operations of the second round are undertaken in accordance with the above chart, based on function G (FIG. 12). The third and fourth rounds are undertaken in like manner, using the function H (FIG. 13) and the function I (FIG. 14) respectively, again in accordance with the above chart.

It will be seen that for each logic block, a function is run based on the actual value of the input from register C, the actual value of the input from register D, and both possible values of the input from register B, with the output of a logic block being determined based on the actual value of a particular bit of register B upon its application to a multiplexer. Thus, calculations covering all eventualities for values of $B_{31}$-$B_0$ to arrive at register B have already been undertaken without waiting for the actual values of those bits to reside in register B. Once the actual bits have arrived in the register B, the value of each bit is provided by a direct path to a multiplexer. This is to be compared with the prior art system wherein the running of a function was undertaken only after the three actual values of inputs from register B, C and D were provided to the logic block 8. In the present situation, the running of a function is undertaken in parallel with the steps described above for providing data to register B, and only the simple step of selecting the output based on the actual value of a bit in register B, using a direct path from the register B to a multiplexer, need to be undertaken.

The foregoing description of the embodiment of the invention has been presented for purposes of illustration and description. It is not intended to be exhaustive or to limit the invention to the precise form disclosed. Other modifications or variations are possible in light of the above teachings.

The embodiment was chosen and described to provide the best illustration of the principles of the invention and its practical application to thereby enable one of ordinary skill of the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of implementing a function by a respective logic block in a plurality of logic blocks connected in parallel to receive inputs from a plurality of registers where each register has an individual connection to each of the plurality of logic blocks, the running of the function by the respective logic block being based on an input of a first variable from a first register which may have a first or a second value, and an input of a second variable from a second register which may have a first or a second value, comprising:
    setting the value of the second variable from the second register to the first or the second value thereof;
    running the function at the plurality of logic blocks based on an input of the first variable set at the first value thereof, and an input of the second variable having said set value thereof, to provide a first output;
    running the function at the plurality of logic blocks based on an input of the first variable set at the second value thereof, and an input of the second variable having said set value thereof, to provide a second output,
    wherein the functions of the plurality of logic blocks are run simultaneously.

2. The method of claim 1 and further comprising selecting either the first or the second output, the first output being selected if the first variable has the first value thereof, the second output being selected if the first variable has the second value thereof.

3. A method of implementing a function by a respective logic block in a plurality of logic blocks connected in parallel to receive inputs from a plurality of registers, where each register has an individual connection to each of the plurality of logic blocks, the running of the function by the respective logic block being based on an input of a first variable from a first register which may have a first or a second value, an input of a second variable from a second register which may have a first or a second value, and an input of a third variable from a third register which may have a first or a second value, comprising:
    setting the value of the second variable to the first or the second value thereof,
    setting the value of the third variable to the first or the second value thereof;
    running the function at the respective logic block based on an input of the first variable set at the first value thereof, an input of the second variable having the set value thereof, and an input of the third variable having the set value thereof, to provide a first output;
    running the function at the respective logic block based on an input of the first variable set at the second value thereof, an input of the second variable having said set value thereof, and an input of the third variable having said set value thereof, to provide a second output,
    wherein the functions of the plurality of logic blocks are simultaneously.

4. The method of claim 3 and further comprising selecting either the first or the second output, the first output being selected if the set value of the first variable is the first value thereof, the second output being selected if the set value of the first variable is the second value thereof.

5. A method of implementing functioning of an encryption engine comprising:
    providing first and second logic blocks, each for running a function; the running of the function of the first logic block based on an input of a first variable from a first register which may have a first or second value and an input of a second variable from a second register which ma have a first or a second value, the running of the function of the second logic block based on an input of the first variable which may have said first or said second value and an input of a third variable from a third register which may have a first or second value;

setting a value of the second variable to the first or the second value thereof;

running the function of the first logic block at a computer system based on an input of the first variable set at the first value thereof, and an input of the second variable based on the set value thereof, to provide a first output;

running the function of the first logic block at the computer system based on an input of the first variable set at the second value thereof, and an input of the second variable based on the set value thereof, to provide a second output;

setting a value of the third variable to the first or the second value thereof;

running the function of the second logic block at the computer system based on an input of the first variable set at the first value thereof, and an input of the third variable based on the set value thereof, to provide a third output;

running the function of the second logic block at the computer system based on an input of the first variable set at the second value thereof, and an input of the third variable based on the set value thereof, to provide a fourth output, wherein the functions of the first and second logic blocks are run simultaneously.

6. The method of claim 5 and further comprising selecting the first or the second output, the first output being selected if the first variable has the first value thereof, the second output being selected if the first variable has the second value thereof.

7. The method of claim 6 and further comprising selecting the third or the fourth output, the fourth output being selected if the first variable has the first value thereof, the second output being selected if the first variable has the second value thereof.

8. The method of claim 5 wherein the functions of the first and second logic blocks are the same function.

* * * * *